(12) United States Patent
Li et al.

(10) Patent No.: US 11,754,803 B2
(45) Date of Patent: Sep. 12, 2023

(54) AUTO FOCUSING LENS ASSEMBLY

(71) Applicant: AAC Optics Solutions Pte. Ltd., Singapore (SG)

(72) Inventors: Linzhen Li, Shenzhen (CN); Jiliang Lu, Shenzhen (CN); Gang Li, Shenzhen (CN); Jin Zhang, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 655 days.

(21) Appl. No.: 16/991,034

(22) Filed: Aug. 12, 2020

(65) Prior Publication Data

US 2020/0379210 A1   Dec. 3, 2020

Related U.S. Application Data

(63) Continuation of application No. PCT/CN2019/089724, filed on Jun. 1, 2019.

(51) Int. Cl.
*G02B 7/09* (2021.01)
*G02B 13/00* (2006.01)
*G02B 27/64* (2006.01)

(52) U.S. Cl.
CPC ............. *G02B 7/09* (2013.01); *G02B 13/001* (2013.01); *G02B 27/646* (2013.01)

(58) Field of Classification Search
CPC ...... G02B 27/646; G02B 6/3514; G02B 7/08; G02B 7/09; G02B 7/182; G02B 15/173; G02B 15/14; G02B 15/177; G02B 15/22; G02B 15/16; G02B 13/18; G02B 13/009; G02B 27/64; G02B 13/02; G02B 7/04; G02B 13/0015; G02B 15/15; G02B 13/0045; G02B 15/17; G02B 15/20; G02B 27/0025; G02B 9/62; G02B 13/04; G02B 7/023; G02B 9/64; G02B 13/001; G02B 13/0065; G02B 15/10; G02B 15/163; G02B 15/167; G02B 23/02; G02B 7/02; G02B 7/022; G02B 7/102; G02B 7/14; G02B 9/04; G02B 9/34; G02B 9/60;

(Continued)

(56) References Cited

U.S. PATENT DOCUMENTS

2011/0091193 A1   4/2011 Lim et al.
2016/0258425 A1*  9/2016 Ladwig ................. G02B 7/09

(Continued)

*Primary Examiner* — Darryl J Collins
*Assistant Examiner* — Tamara Y. Washington
(74) *Attorney, Agent, or Firm* — W&G Law Group

(57) ABSTRACT

Provided is an auto focusing lens assembly, including a lens; a first base including a first side plate; a second base including a bottom plate, a first base body, and a second base body including a second side plate; and a pair of restoring structures. The first base is mounted to the second base body and slidable along the optical axis. The first side plate includes: a first plate body, and a second plate body. The restoring structure includes: an elastic member including one end connected to the first side plate and the other end connected to the first base body; a magnet assembly provided between the second side plate and the second plate body, and a guiding structure provided between the second side plate and the second plate body. The auto focusing lens assembly provided by the present invention can achieve a compact structure and a miniaturization design.

9 Claims, 11 Drawing Sheets

(58) Field of Classification Search
CPC .... G02B 13/002; G02B 13/004; G02B 13/06; G02B 13/16; G02B 15/12; G02B 15/161; G02B 17/08; G02B 17/0804; G02B 17/0808; G02B 17/0896; G02B 21/26; G02B 23/08; G02B 26/004; G02B 26/0808; G02B 26/0816; G02B 27/0911; G02B 27/644; G02B 3/14; G02B 7/021; G02B 7/025; G02B 7/18; G02B 7/24; G02B 7/28; G02B 9/00; G02B 9/24; H04N 5/23287; H04N 5/2252; H04N 5/2254; H04N 5/2329; H04N 5/2257; H04N 5/2253; H04N 5/23248; H04N 5/2328; H04N 5/225; H04N 5/232; H04N 5/23209; H04N 5/23212; H04N 5/23245; H04N 5/23258; H04N 5/23264; H04N 13/0203; H04N 13/0239; H04N 13/0296; H04N 5/222; H04N 5/228; H04N 5/23229; H04N 5/23251; H04N 5/23254; G03B 5/00; G03B 3/00; G03B 3/14; G03B 5/02; G03B 5/06; G03B 2205/0015; G03B 3/10; G03B 2205/0069; G03B 2205/002; G03B 2205/0007; G03B 13/36; G03B 17/02; G03B 17/04; G03B 17/14; G03B 17/12; G03B 2205/0046; G03B 2205/0053; G03B 2205/0092

See application file for complete search history.

(56) References Cited

U.S. PATENT DOCUMENTS

| | | | |
|---|---|---|---|
| 2016/0299349 A1* | 10/2016 | Cho | G03B 5/02 |
| 2018/0321503 A1* | 11/2018 | Brown | H04N 23/687 |
| 2022/0236516 A1* | 7/2022 | Suzuki | G03B 13/36 |

* cited by examiner

AUTO FOCUSING LENS ASSEMBLY

TECHNICAL FIELD

The present invention relates to the field of lens optical image stabilization and auto focusing, and more particularly, to an auto focusing lens assembly.

BACKGROUND

In recent years, portable terminals, such as smartphones and tablet computers, have been equipped with high-performance lens module. Such high-performance lens module generally has an auto focusing function and an optical image stabilization (OIS) function.

The auto focusing function of the existing camera lens module is implemented by a voice coil motor driving a lens to move to achieve auto focusing and then driving the lens again to restore to an initial position. However, the lens having such a structure is relatively complicated, and thus it is difficult to achieve miniaturization of the lens module.

Therefore, it is needed to provide a new camera lens module to solve the problems described above.

SUMMARY

The present invention aims to provide an auto focusing lens assembly having a simple and compact structure that can achieve a miniaturization design.

The purpose of the present invention is achieved by the following technical solutions.

Embodiments of the present invention provide an auto focusing lens assembly, include: a lens; a first base; a second base; and a pair of restoring structures. The lens is located in the first base. The second base includes a bottom plate, a first base body extending from the bottom plate while being bent and provided with a light-through hole, and a second base body spaced apart from the first base body in a direction of an optical axis of the lens. The first base is mounted to the second base body and slidable in the direction of the optical axis. The first base includes a first side plate provided at each of two sides of the lens. The second base body includes a second side plate connected to the bottom plate and located at an outer side of the first side plate. The first side plate includes: a first plate body opposite to the second side plate, and a second plate body connected to the first plate body and extending to a top of the second side plate while being bent. The pair of restoring structures are provided at the two sides of the lens, respectively, and each restoring structure of the pair of restoring structures includes: an elastic member including one end connected to the first side plate and the other end connected to the first base body; a magnet assembly provided between the second side plate and the second plate body, and a guiding structure provided between the second side plate and the second plate body.

As an improvement, a projection of the elastic member in a direction perpendicular to the optical axis does not overlap a projection of the magnet assembly in the direction perpendicular to the optical axis.

As an improvement, a first hook is provided at a side of the first side plate facing towards the first base body, and a second hook is provided at a side of the first base body facing towards the first side plate; and the one end of the elastic member is hooked to the first hook, and the other end of the elastic member is hooked to the second hook.

As an improvement, the second plate body cooperates with the first base body to form a receiving groove for receiving the elastic member, the first hook is provided at a wall surface of the receiving groove facing towards the first base body, and the second hook is provided at a wall surface of the receiving groove facing towards the second plate body.

As an improvement, the magnet assembly includes a first magnet provided at a side of the second side plate facing towards the second plate body, and a second magnet provided at a side of the second plate body facing towards the second side plate.

As an improvement, a first recess is provided at the side of the second side plate facing towards the second plate body, and the first magnet is embedded into the first recess; and a second recess is provided at the side of the second plate body facing towards the second side plate, and the second magnet is embedded into the second recess.

As an improvement, two sides of the magnet assembly are each provided with the guiding structure.

As an improvement, the guiding structure includes a first guiding groove formed in the second side plate along the optical axis, a second guiding groove formed in the second plate body along the optical axis, and a ball embedded between the first guiding groove and the second guiding groove.

As an improvement, the guiding structure is provided between the elastic member and the magnet assembly.

Compared with the related art, in the embodiments of the present invention, the elastic member cooperates with the magnet assembly to pull the deviated first base in such a manner that the first base is restored to an initial position under guiding of the guiding structure. Compared with a conventional method using a voice coil motor, a design of the embodiments of the present invention with the restoring structure has a simple structure. Moreover, the elastic member includes an end connected to the first side plate and another end connected to the first base body, and the magnet assembly and the guiding structure are located between the second side plate and the second plate body. In this way, an overall structure formed by the restoring structure, the first base, the second base and the lens is very compact, so that an overall dimension of the lens assembly can be made small, thereby achieving miniaturization design.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present invention. Moreover, in the drawings, like reference numerals designate corresponding parts throughout the several views.

DESCRIPTION OF EMBODIMENTS

The present invention will be further described in the following with reference to the accompanying drawings and embodiments.

Figure 1:
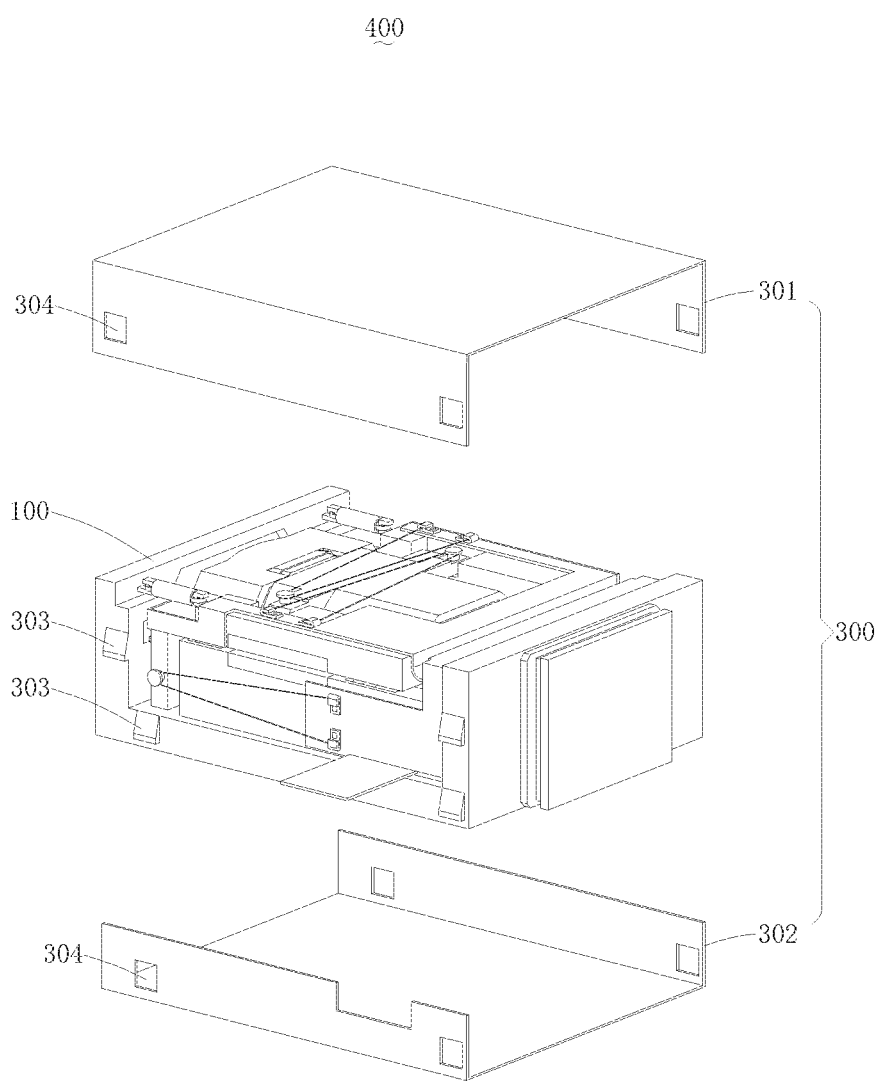
FIG. 1 is an exploded view of a part of a lens module according to an embodiment of the present invention.
Figure 2:
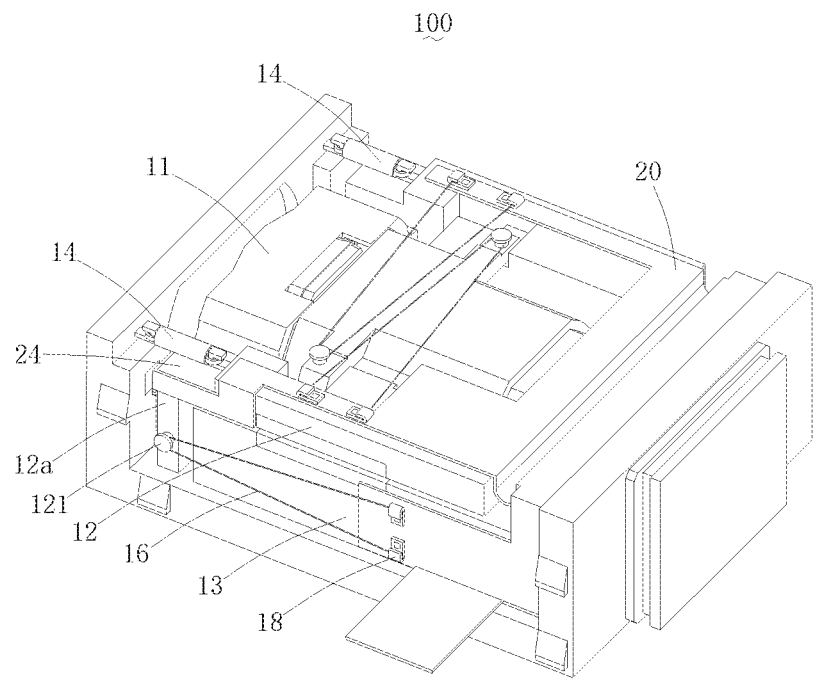
FIG. 2 is a schematic perspective view of a structure of a lens assembly according to an embodiment of the present invention.
Figure 3:
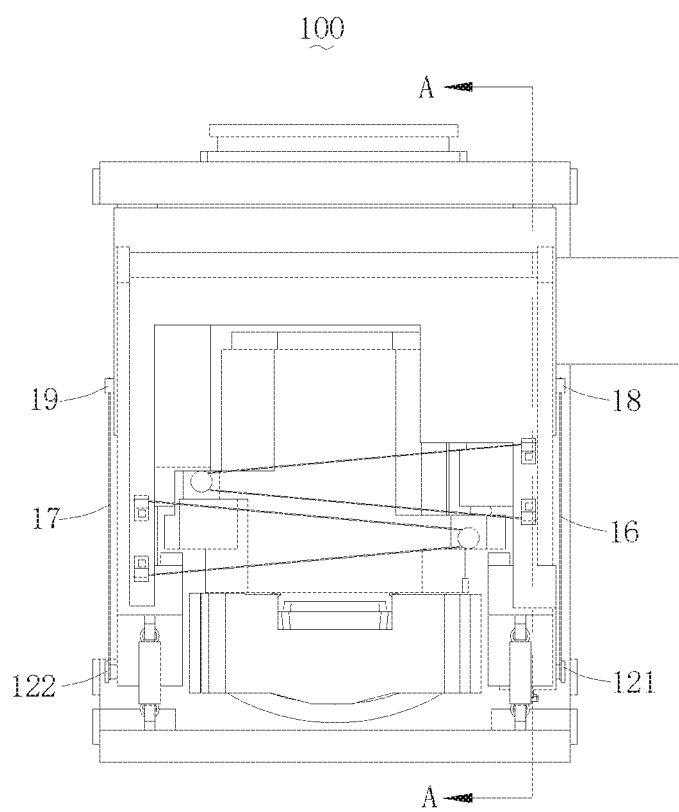
FIG. 3 is a top view of a lens assembly according to an embodiment of the present invention
Figure 4:
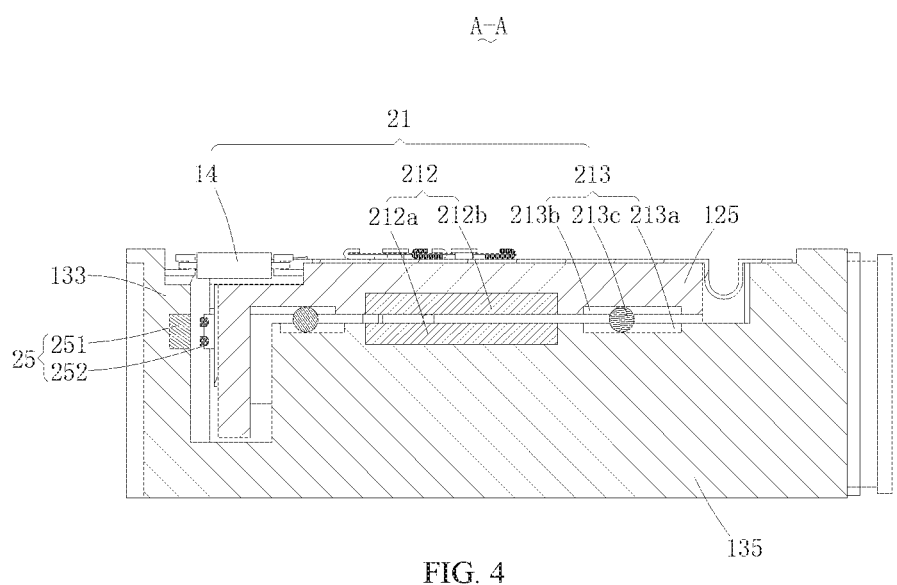
FIG. 4 is a schematic cross-sectional view along line A-A shown in FIG. 3.
Figure 5:
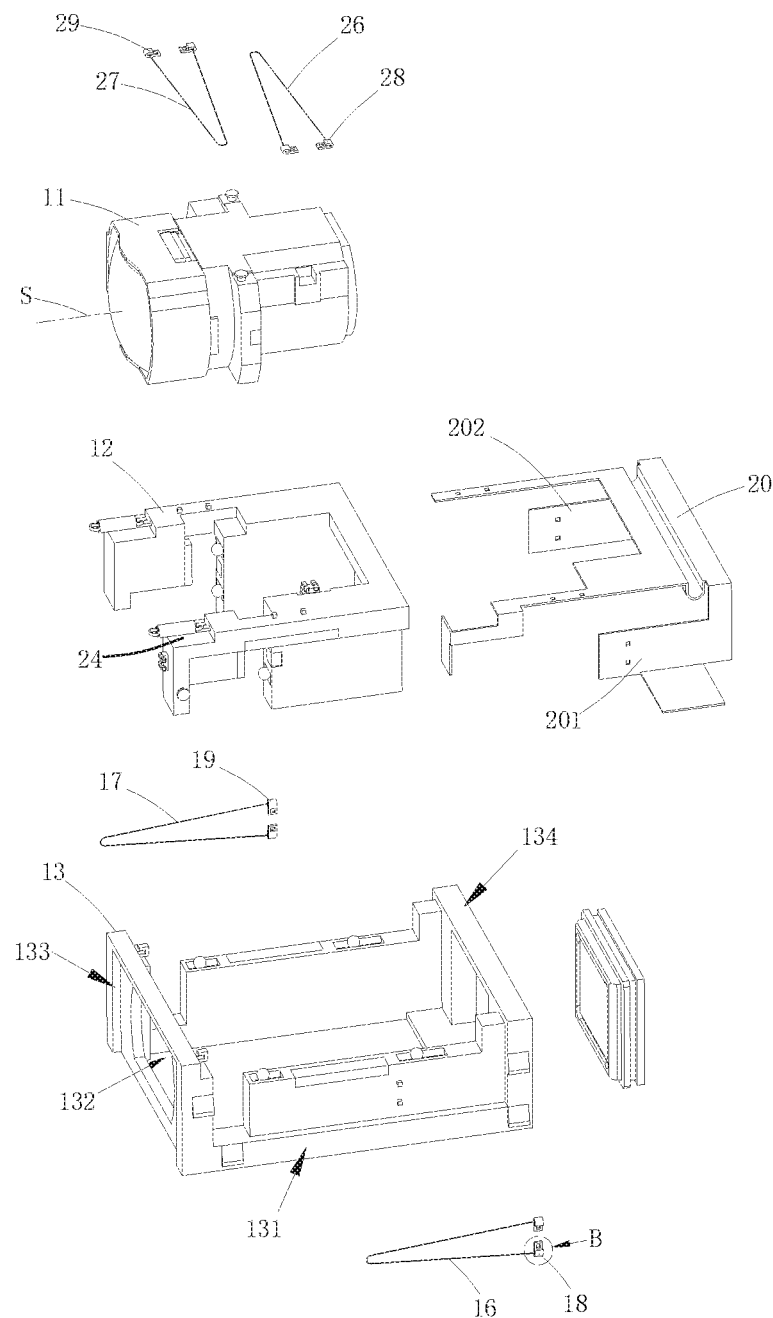
FIG. 5 is an exploded view of a lens assembly according to an embodiment of the present invention.
Figure 6:
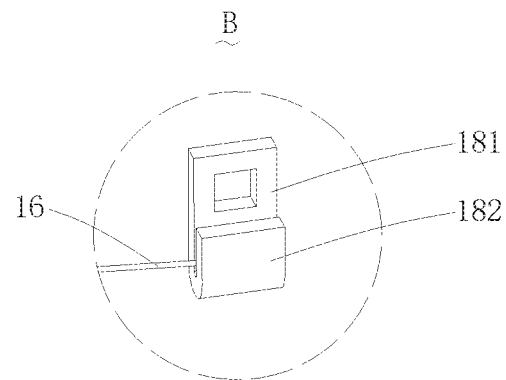
FIG. 6 is an enlarged view of part B shown in FIG. 5.
Figure 7:
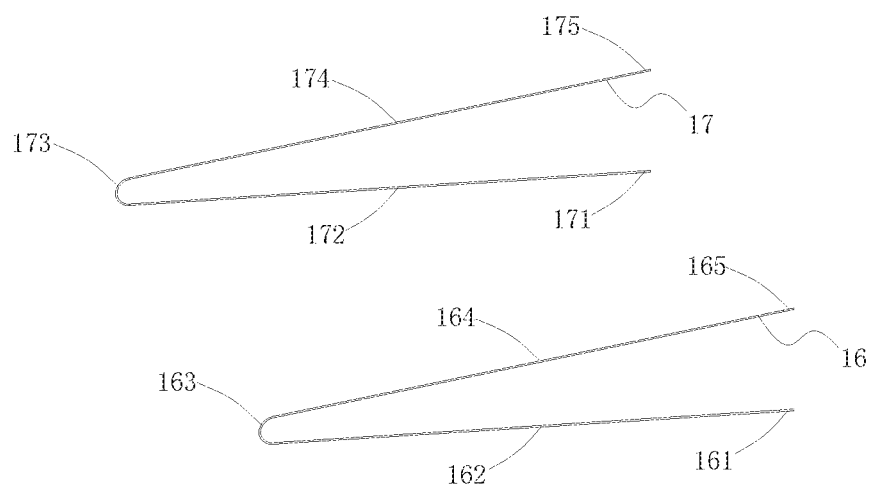
FIG. 7 shows structures of a first memory alloy wire and a second memory alloy wire.
Figure 8:
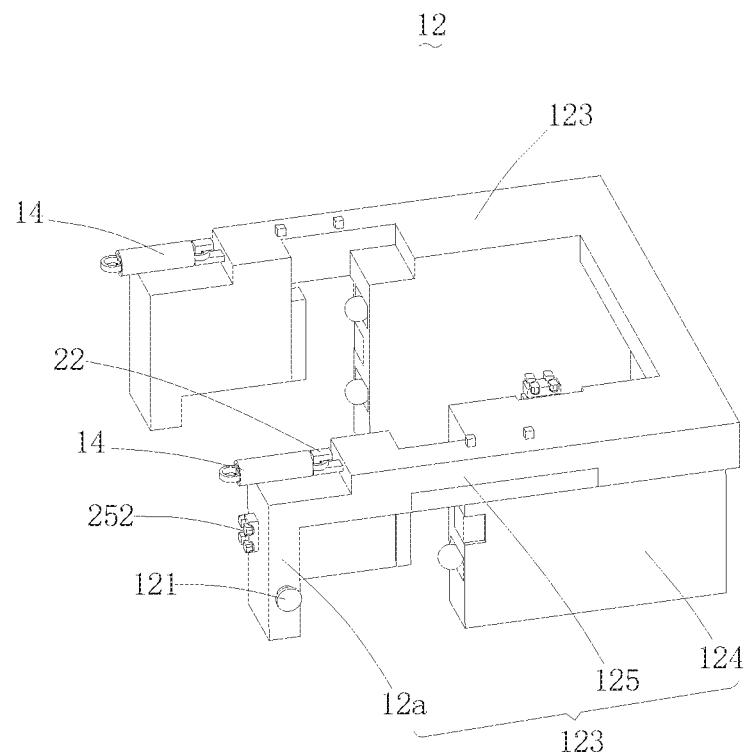
FIG. 8 is a schematic diagram of a structure of a first base.
Figure 9:
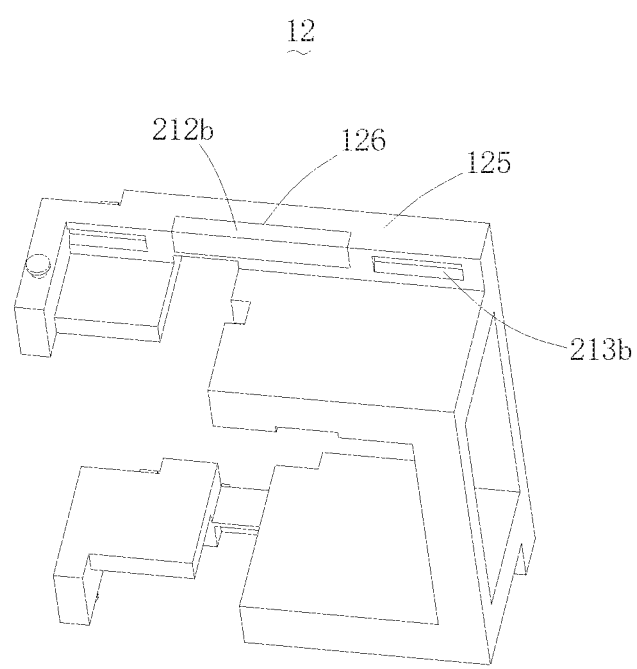
FIG. 9 is a schematic diagram of a structure of a first base from another perspective.
Figure 10:
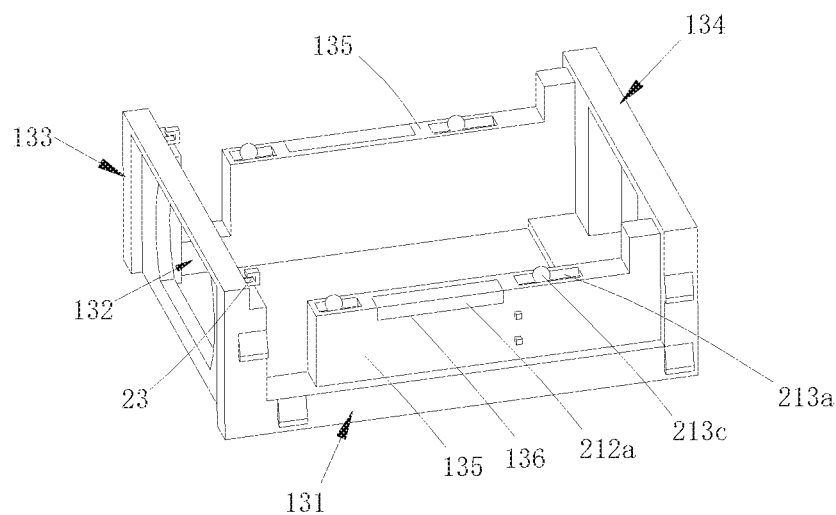
FIG. 10 is a schematic diagram of a structure of a second base from another perspective.
Figure 11:
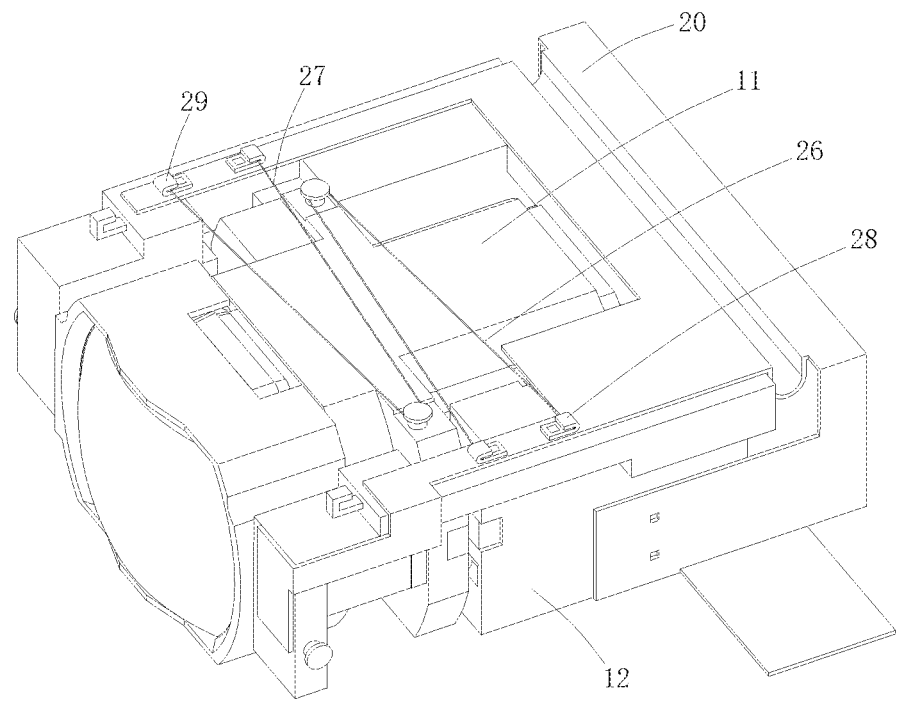
FIG. 11 is a schematic perspective view of a combined structure formed by a lens, a first base, and a circuit board according to an embodiment of the present invention.
Figure 12:
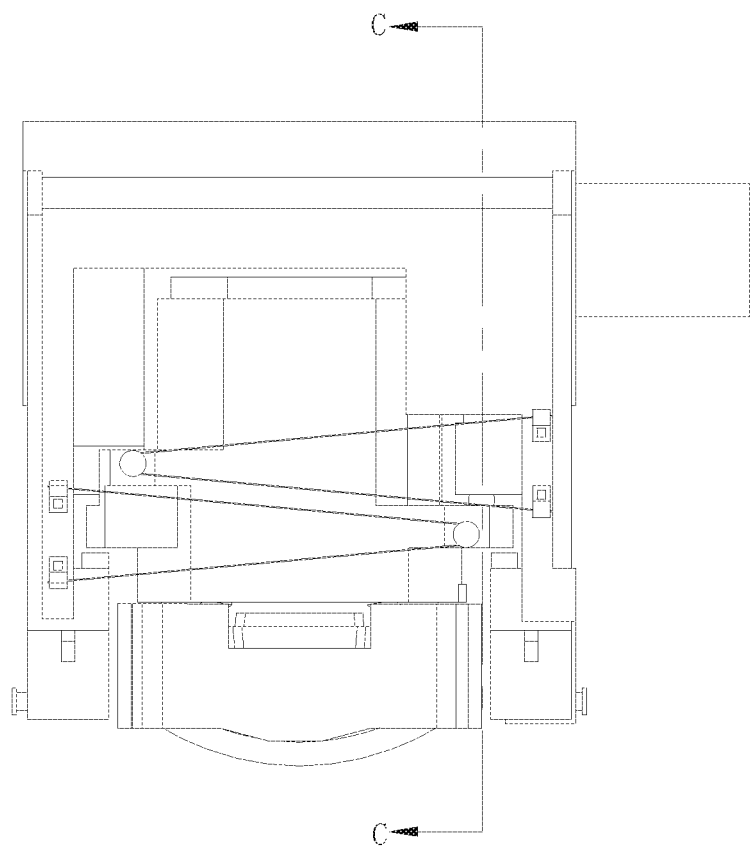
FIG. 12 is a top view of a combined structure formed by a lens, a first base, and a circuit board according to an embodiment of the present invention.
Figure 13:
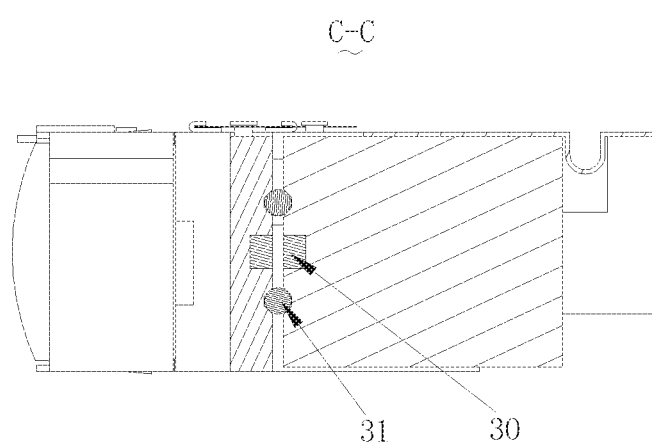
FIG. 13 is a schematic cross-sectional view along line C-C shown in FIG. 12.
Figure 14:
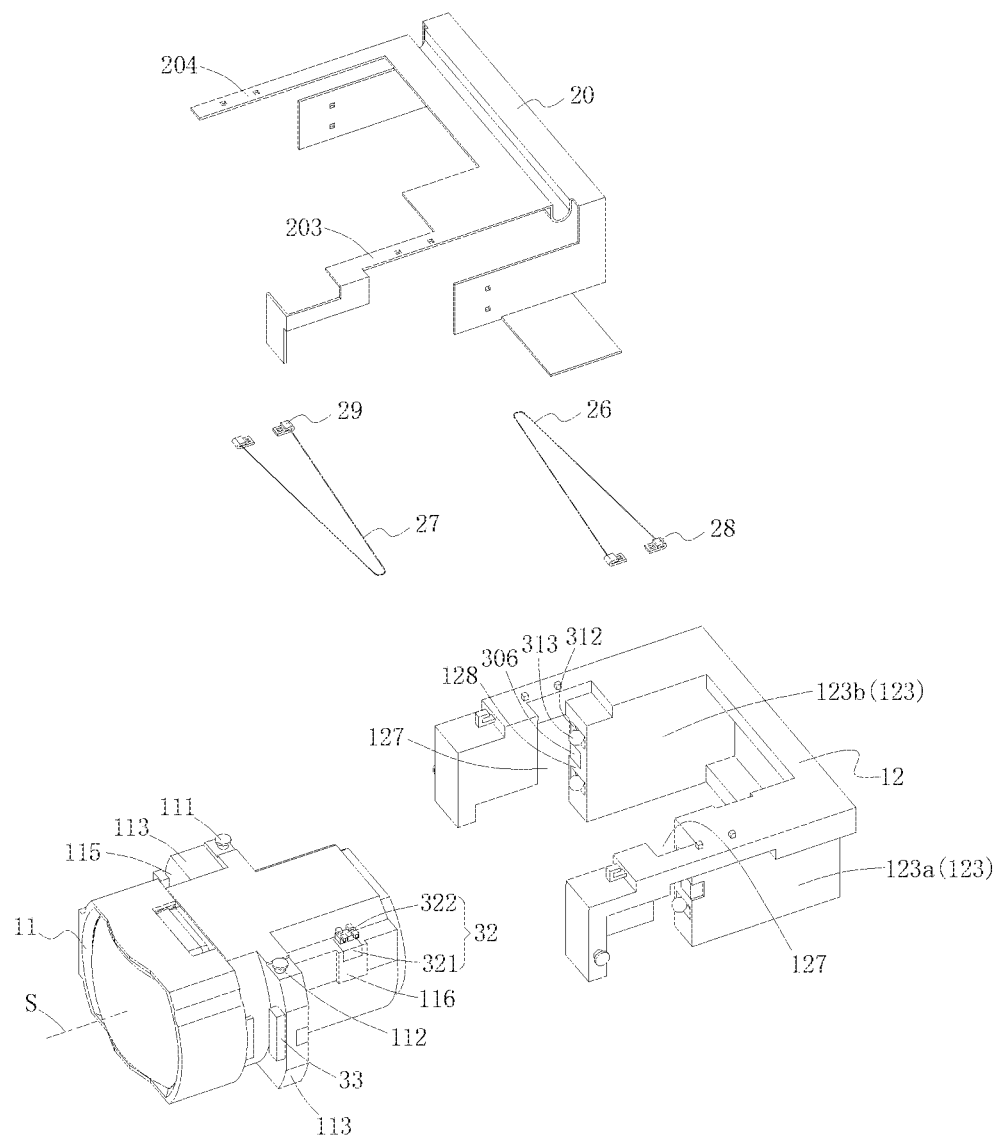
FIG. 14 is an exploded view of the structure shown in FIG. 11.
Figure 15:
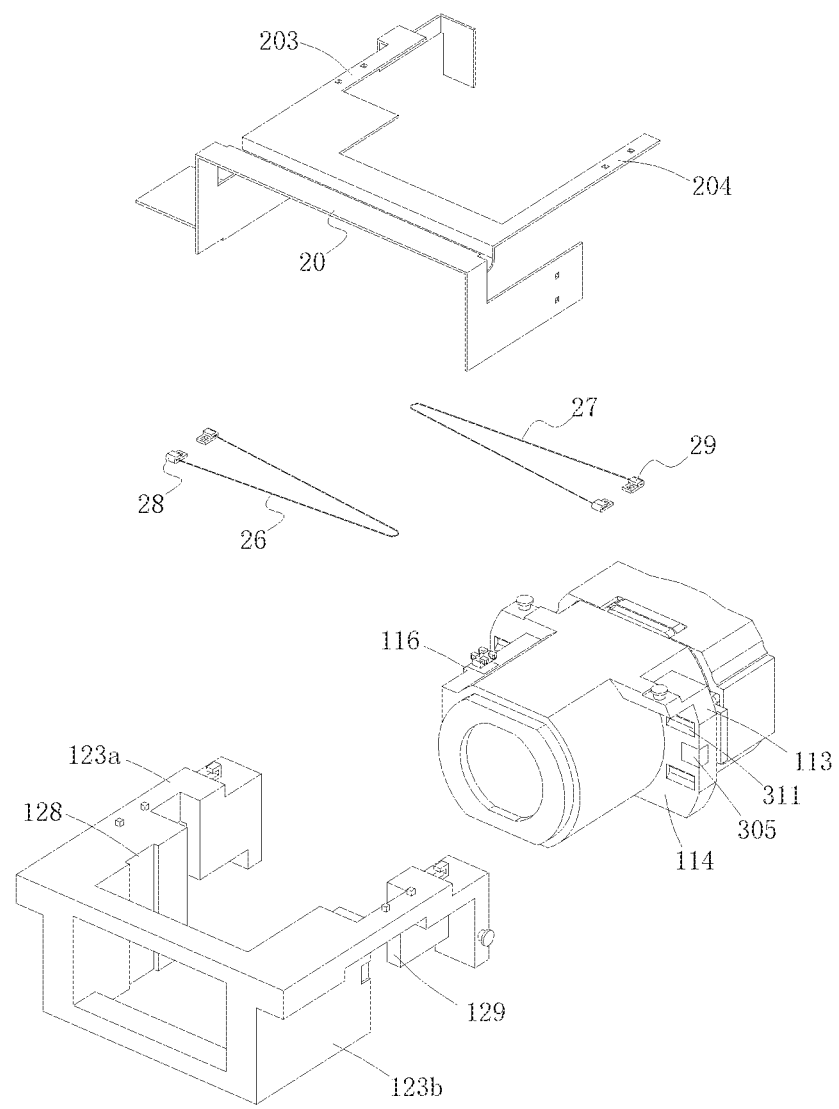
FIG. 15 is an exploded view of the structure shown in FIG. 11 from another perspective.
Figure 16:
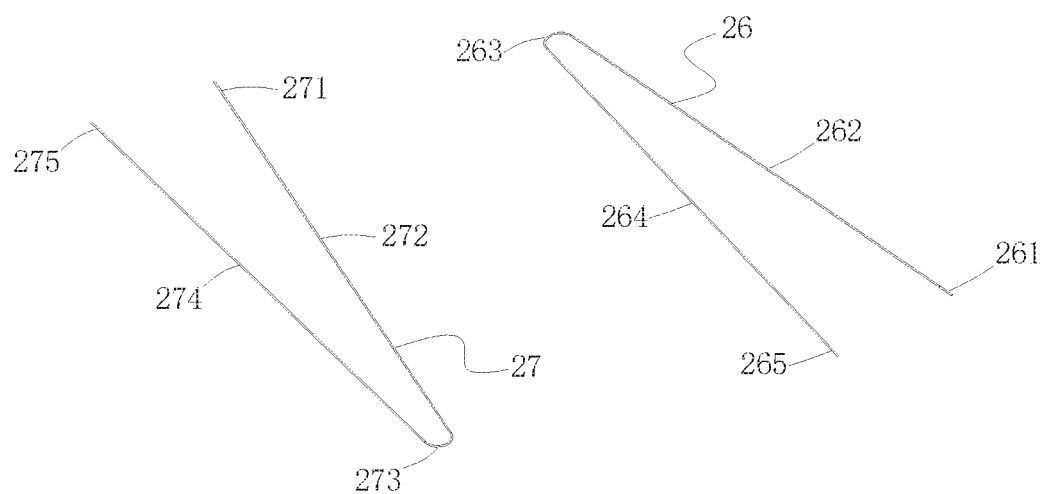
FIG. 16 shows structures of a first memory alloy line and a second memory alloy line.

With reference to FIG. 1, embodiments of the present invention provide a lens module 400, which includes: a lens assembly 100 that can achieve auto focusing and optical image stabilization, and a shell 300. The shell 300 includes an upper shell body 301 and a lower shell body 302, and the upper shell body 301 and the lower shell body 302 define a receiving space for receiving the lens assembly 100. Both the upper shell body 301 and the lower shell body 302 are snap-connected to the lens assembly 100. In an example, a block 303 protrudes from each of two sides of the lens assembly 100, and a bayonet 304 is provided at each of two sides of the upper shell body 301 and the lower shell body 302. In this case, the upper shell body 301 and the lower shell body 302 are snap-connected to the lens assembly 100 through cooperation of the block 303 and the bayonet 304.

With reference to FIG. 2 to FIG. 10, as an improvement of this embodiment, the lens assembly 100 includes a lens 11, a first base 12, a second base 13, a pair of elastic members 14, a first memory alloy wire 16 and a second memory alloy wire 17. The lens 11 is located in the first base 12. The second base 13 includes a bottom plate 131, a first base body 133 extending from the bottom plate 131 and provided with a light-through hole 132, and a second base body 134 spaced apart from the first base body 133 in a direction of an optical axis S of the lens 11. The first base 12 is mounted to the second base body 134 and is slidable in the direction of the optical axis S. The first base 12 includes an extending arm 12a extending to a position between the first base body 133 and the second base body 134. Two elastic members 14 are respectively arranged at two sides of the lens 11. The elastic member 14 includes an end connected to the first base 12, and anther end connected to the first base body 133. The two elastic members 14 are symmetrically arranged. The first memory alloy wire 16 and second memory alloy wire 17 are symmetrically arranged at two sides of the lens 11. The first memory alloy wire 16 includes a first fixing portion 161 fixed to the second base body 134, a first connecting portion 162 extending from the first fixing portion 161 towards the extending arm 12a, a second fixing portion 163 fixed to the extending arm 12a, a second connecting portion 164 reversely extending from the second fixing portion 163 towards the second base body 134, and a third fixing portion 165 connected to the second connecting portion 164 and fixed to the second base body 134. A symmetry axis of the first connecting portion 162 and the second connecting portion 164 is parallel to the optical axis S of the lens 11. The second memory alloy wire 17 includes a fourth fixing portion 171 fixed to the second base body 134, a third connecting portion 172 extending from the fourth fixing portion 171 towards the extending arm 12a, a fifth fixing portion 173 fixed to the extending arm 12a, a fourth connecting portion 174 reversely extending from the fifth fixing portion 173 towards the second base body 134, and a sixth fixing portion 175 connected to the fourth connecting portion 174 and fixed to the second base body 134. A symmetry axis of the third connecting portion 172 and the fourth connecting portion 174 is parallel to the optical axis S of the lens 11.

Initially, the first base 12 is at an initial position of the second base 13, that is, the lens 11 is at a preset initial position. At this time, the elastic member 14 is in a stretched state and has a pre-tension, and the first memory alloy wire 16 and the second memory alloy wire 17 are in a tight state. When performing focusing, a current is supplied to the first memory alloy wire 16 and the second memory alloy wire 17, then the first connecting portion 162, the second connecting portion 164, the third connecting portion 172, and the fourth connecting portion 174 are energized to be shortened, so as to pull the first base 12 to move relative to the second base 13 in a direction of the optical axis S of the lens 11. The first base 12 drives the lens 11 to move relative to the second base 13 to achieve focusing of the lens 11. At this time, the elastic member 14 is in a stretched state of a greater deformation. After focusing is completed, power is off, the elastic member 14 pulls the first base 12 back to the initial position, and the lens 11 is restored to the initial position along with the first base 12.

In this embodiment, the first memory alloy wire 16 and the second memory alloy wire 17 are energized to deform to drive the lens 11 to move in the direction of the optical axis S, so as to achieve autofocusing of the lens 11. Compared with a conventional method using a coil for controlling, this driving method used in this embodiment is simple in structure and convenient in assembling, and can achieve a miniaturization design for the lens assembly 100. Moreover, this design method can allow the first memory alloy wire 16 and the second memory alloy wire 17 to provide sufficient driving forces without being subjected to a large strain force during movement of the driving lens 11.

As an improvement of this embodiment, an angle is formed between the first connecting portion 162 and the second connecting portion 164, and the formed angle is 9.1°±2°, 9.1° as an example. It should be noted that the angle formed between the first connecting portion 162 and the second connecting portion 164 is not limited to the above-mentioned angles, and can also be other angles. In general, the smaller angle leads to the smaller strain for the first memory alloy wire 16 and the greater stress force applied to the first memory alloy wire 16. The angle can be determined according to an actual design requirement.

As an improvement of this embodiment, an angle is formed between the third connecting portion 172 and the fourth connecting portion 174, and the formed angle is 9.1°±2°, 9.1° as an example. It should be noted that the angle formed between the third connecting portion 172 and the fourth connecting portion 174 is not limited to the above-mentioned angles, and can also be other angles. In general, the smaller angle leads to the smaller strain for the second memory alloy wire 17 and the greater strain force applied to the second memory alloy wire 17. The angle can be determined according to an actual design requirement.

As an improvement of this embodiment, the lens assembly 100 further includes two first wire-connecting terminals 18 spaced apart from each other and arranged at one side of the second base body 134, and the first fixing portion 161 and the third fixing portion 165 are respectively connected to the two first wire-connecting terminals 18. In an example, each first wire-connecting terminal 18 includes a first clamping portion 181, and a second clamping portion 182 bent from one end of the first clamping portion 181 and extending in a reverse direction. The first fixing portion 161 or the third fixing portion 165 is clamped and fixed between the first clamping portion 181 and the second clamping portion 182, and this connection method will be used in the following description. Providing the first wire-connecting terminals 18 can not only facilitate connecting the first memory alloy wire 16 with the second base 13, but also facilitate connecting the first memory alloy wire 16 with a circuit. It can be understood that, it is also possible that the lens assembly 100 is provided with no first wire-connecting terminal 18, and two ends of the first memory alloy wire 16 may be fixed to the second base 13 by other connection methods.

As an improvement of this embodiment, the lens assembly 100 further includes two second wire-connecting terminals 19 spaced apart from each other and mounted to another side of the second base body 134, and the fourth fixing portion 171 and the sixth fixing portion 175 are respectively connected to the two second wire-connecting terminals 19. Providing the second wire-connecting terminals 19 can not only facilitate connecting the second memory alloy wire 17 with the second base 13, and on the other hand, but also facilitate connecting the second memory alloy wire 17 with a circuit. It can be understood that, it is also possible that the lens assembly 100 is provided with no second wire-connecting terminal 19, and two ends of the second memory alloy line 17 may be fixed to the second base 13 by other connection methods.

As an improvement of this embodiment, a first protruding pillar 121 protrudes from the extending arm 12a located at one side of the first base 12, and the second fixing portion 163 is arranged around the first protruding pillar 121. In an example, an end of the first protruding pillar 121 facing away from the lens 11 has a larger diameter, thereby preventing a middle portion of the first memory alloy wire 16 from falling off from the first protruding pillar 121.

As an improvement of this embodiment, a second protruding pillar 122 protrudes from the extending arm 12a located at another side of the first base 12, and the fifth fixing portion 173 is arranged around the second protruding pillar 122. In an example, an end of the second protruding pillar 122 facing away from the lens 11 has a larger diameter, thereby preventing a middle portion of the second memory alloy wire 17 from falling off from the second protruding pillar 122.

As an improvement of this embodiment, the lens assembly 100 further includes a circuit board 20 including a first extending portion 201 attached to one second base body 134 and a second extending portion 202 attached to the other second base body 134. The first fixing portion 161 and the third fixing portion 165 are indirectly fixed to the second base body 134 through the first extending portion 201, and the fourth fixing portion 171 and the sixth fixing portion 175 are indirectly fixed to the second base body 134 through the second extending portion 202. The first fixing portion 161 and the third fixing portion 165 are fixed to the first extending portion 201 of the circuit board 20 through the first wire-connecting terminal 18, and the fourth fixing portion 171 and the sixth fixing portion 175 are fixed to the second extending portion 202 of the circuit board 20 through the second wire-connecting terminal 19, so as to achieve circuit conductions of the circuit board 20 with the first memory alloy wire 16 and second memory alloy wire 17.

As an improvement of this embodiment, the lens assembly 100 further includes a restoring structure 21 provided between the first base 12 and the second base body 134 and configured to restore the focused lens 11 and first base 12 to an initial position. The first base 12 includes first side plates 123 provided at two sides of the lens 11. The second base body 134 includes second side plates 135 connected to the bottom plate 131 and located at an outer side of the first side plates 123. The first side plate 123 includes: a first plate body 124 opposite to the second side plate 135, and a second plate body 125 connected to the first plate body 124 and extending to a top of the second side plate 135 while being bent. A restoring structure 21 is provided at each of two sides of the lens 11, and includes the elastic member 14 described above, a magnet assembly 212 provided between the second side plate 135 and the second plate body 125, and a guiding structure 213 provided between the second side plate 135 and the second plate body 125. The elastic member 14 includes an end connected to the first side plate 123, and anther end connected to the first base body 133. In this embodiment, the elastic member 14 cooperates with the magnet assembly 212 to pull the deviated first base 12 in such a manner that the first base 12 is restored to an initial position under guiding of the guiding structure 213. Compared with a conventional method using a voice coil motor, a design of this embodiment with the restoring structure 21 has a simple structure. Moreover, the elastic member 14 includes an end connected to the first side plate 123 and another end connected to the first base body 133, and the magnet assembly 212 and the guiding structure 213 are located between the second side plate 135 and the second plate body 125. In this way, an overall structure formed by the restoring structure 14, the first base 12, the second base 13 and the lens 11 is very compact, so that an overall dimension of the lens assembly 100 can be made small, thereby achieving a miniaturization design.

As an improvement of this embodiment, a projection of the elastic member 14 in the direction perpendicular to the optical axis S does not overlap a projection of the magnet assembly 212 in the direction perpendicular to the optical axis S.

As an improvement of this embodiment, a first hook 22 is provided at a side of the first side plate 123 facing towards the first base body 133, and a second hook 23 is provided at a side of the first base body 133 facing towards the first side plate 123. The elastic member 14 includes an end hooked onto the first hook 22, and another end is hooked onto the second hook 23.

As an improvement of this embodiment, the second plate body 125 cooperates with the first base body 133 to form a receiving groove 24 for receiving the elastic member 14, the first hook 22 is provided at a wall surface of the receiving groove 24 facing towards the first base body 133, and the second hook 23 is provided at a wall surface of the receiving groove 24 facing towards the second plate body 125. By providing the receiving groove 24, the elastic member 14 can be received in the receiving groove 24, so that an overall structure of the lens assembly 100 is more compact and thus the dimension of the lens assembly 100 can be made smaller, thereby achieving a miniaturization design.

As an improvement of this embodiment, the magnet assembly 212 includes a first magnet 212a arranged at a side of the second side plate 135 facing towards the second plate body 125, and a second magnet 212b arranged at a side of the second plate body 125 facing towards the second side plate 135. When the lens 11 is at an initial position, the first magnet 212a directly faces the second magnet 212b. When the first memory alloy wire 16 and the second memory alloy wire 17 pull the first base 12 to move relative to the second base 13, the first magnet 212a is misaligned with the second magnet 212b. After the first memory alloy wire 16 and the second memory alloy wire 17 are powered off, the first magnet 212a and the second magnet 121b pull the first base 12 and the lens 11 back to the initial position under a magnetic force thereof and an elastic force of the elastic member 14.

As an improvement of this embodiment, a first recess 136 is provided at a side of the second side plate 135 facing towards the second plate body 125, and the first magnet 212a is embedded into the first recess 136. A second recess 126 is provide at a side of the second plate body 125 facing towards the second side plate 135, and the second magnet 212b is embedded into the second recess 126. The first magnet 212a is received in the first recess 136, and the second magnet 212b is received in the second recess 126. In this way, a space of the lens assembly 100 can be reasonably utilized, leading to a more compact structure.

As an improvement of this embodiment, two sides of each magnet assembly 212 are each provided with a guiding structure 213. Each guiding structure 213 includes a first guiding groove 213a formed in the second side plate 135 along the optical axis S direction, a second guiding groove 213b formed in the second plate body 125 along the optical axis S direction, and a ball 213c embedded between the first guiding groove 213a and the second guiding groove 213b. By providing the guiding structure 213 at each of two sides of the magnet assembly 212, a frictional force generated when the second side plate 135 and the second plate body 125 are sliding relative to each other can be reduced, so that deviation and restoration of the first base 12 can be more sensitive.

As an improvement of this embodiment, the guiding structure 213 is provided between the elastic member 14 and the magnet assembly 212.

As an improvement of this embodiment, the lens assembly 100 further includes a focusing detection mechanism 25 for detecting a displacement distance of the first base 12 along the direction of the optical axis S. The focusing detection mechanism 25 includes a fifth magnet 251 provided on the second base 13, and a first Hall sensor 252 provided on the first base 12 and directly facing the fifth magnet 251. The focusing detection mechanism 25 is configured to detect an amount of deviation of the first base 12 towards the second base 13, so as to control a current supplied to the first memory alloy wire 16 and the second memory alloy wire 17 in such a manner that the lens 11 can accurately reach a focus position, thereby improving imaging quality of the lens 11. The first Hall sensor 252 is indirectly mounted to the first base 12 through the circuit board 20. In an example, the first extending portion 201 of the circuit board 20 extends to a surface of the first side plate 123 of the first base 12 facing towards the first base body 133. The first Hall sensor 252 is connected to the first extending portion 201. The fifth magnet 251 is mounted to the first base body 133.

With reference to FIG. 11 to FIG. 16, as an improvement of this embodiment, for distinguishing one from another, one of the two first side plates 123 is referred to as a first side wall 123a, and the other one of the two first side plates 123 is referred to as a second side wall 123b. The lens assembly 100 further includes a first memory alloy line 26 and a second memory alloy line 27. The lens 11 is located between the first side wall 123a and the second side wall 123b. The first memory alloy line 26 includes a first fixing end 261 fixed to the first side wall 123a, a first extending section 262 extending from the first fixing end 261 towards the second side wall 123b and suspended above the lens 11, a second fixing end 263 fixed to a side of the lens 11 close to the second side wall 123b, a second extending section 264 extending in a reverse direction from the second fixing end 263 towards the first side wall 123a and suspended above the lens 11, and a third fixing end 265 connected to the second extending section 264 and fixed to the first side wall 123a. A symmetry axis of the first extending section 262 and the second extending section 264 is perpendicular to the optical axis S. The second memory alloy line 27 includes a fourth fixing end 271 fixed to the second side wall 123b, a third extending section 272 extending from the fourth fixing end 271 towards the first side wall 123a and suspended above the lens 11, a fifth fixing end 273 fixed to a side of the lens 11 close to the first side wall 123a, a fourth extending section 274 extending in a reverse direction from the fifth fixing end 273 towards the second side plate 124 and suspended above the lens 11, and a sixth fixing end 275 connected to the fourth extending section 274 and fixed to the second side plate 124. A symmetry axis of the third extending section 272 and the fourth extending section 274 is perpendicular to the optical axis S.

In an example, when there is no deviation for the lens 11, the lens 11 is located at an initial position of the first base 12, the first memory alloy line 26 and the second memory alloy line 27 are in a loose state. When the lens 11 is deviated towards the first side wall 123a or the second side wall 123b, for example, when the lens 11 is deviated towards the first side wall 123a, the second memory alloy line 27 is elongated. At this time, a current is supplied to the second memory alloy line 27, and the second memory alloy line 27 is energized to be heated and shortened by deforming due to its physical characteristics. In this case, the lens 11 is pulled back to the initial position, thereby achieving optical image stabilization for the lens 11.

In this embodiment, the first memory alloy line 26 and the second memory alloy line 27 are energized to deform to drive the lens 11 to move in the direction perpendicular to the optical axis S, so as to achieve optical image stabilization. Compared with a conventional method using an image stabilization coil, this driving method used in this embodiment is simple in structure and convenient in assembling, and can achieve a miniaturization design for the lens assembly 100. Moreover, this design method can allow the first memory alloy line 26 and the second memory alloy line 27 to provide sufficient driving forces without being subjected to a large strain force during movement of the driving lens 11.

An angle is formed between the first extending section 262 and the second extending section 264, and the formed angle is 10.4°±2°, 10.4° as an example. It should be noted that the angle formed between the first extending section 262 and the second extending section 264 is not limited to the above-mentioned angles, and can also be other angles. In general, the smaller angle is leads to the smaller strain for the first memory alloy line 26 and the greater stress force applied to the first memory alloy line 26. The angle can be determined according to an actual design requirement.

An angle is formed between the third extending section 272 and the fourth extending section 274, and the formed angle is 10.4°±2°, 10.4° as an example. It should be noted that the angle formed between the third extending section 272 and the fourth extending section 274 is not limited to the above-mentioned angles, and can also be other angles. In general, the smaller angle leads to the smaller strain for the second memory alloy line 27 and the greater stress force applied to the second memory alloy line 27. The angle can be determined according to an actual design requirement.

As an improvement of this embodiment, the lens assembly 100 further includes two first electric-connecting terminals 28 spaced apart from each other and provided on the first side wall 123a, and the first fixing end 261 and the third fixing end 265 are respectively connected to the two first electric-connecting terminals 28. Providing the first electric-connecting terminals 28 can not only facilitate connecting the first memory alloy line 26 with the first side wall 123a, but also facilitate connecting the first memory alloy line 26 with a circuit. It can be understood that, it is also possible that the lens assembly 100 is provided with no first electric-connecting terminal 28, and two ends of the first memory alloy line 26 may be fixed to the first side wall 123a by other connection methods.

As an improvement of this embodiment, the lens assembly 100 further includes two second electric-connecting terminals 29 spaced apart from each other and provided on the second side wall 123b, and the fourth fixing end 271 and the sixth fixing end 275 are respectively connected to the two second electric-connecting terminals 29. Providing the second electric-connecting terminals 29 can not only facilitate connecting the second memory alloy line 27 with the second side wall 123b, but also facilitate connecting the second memory alloy line 27 with a circuit. It can be understood that, it is also possible that the lens assembly 100 is provided with no second electric-connecting terminal 29, and two ends of the first memory alloy line 27 may be fixed to the second side plate 123b by other connection methods.

As an improvement of this embodiment, a first protruding column 111 protrudes from a side of the lens 11 facing away from the first side wall 123a, and the second fixing end 263 of the first memory alloy line 26 is hung on the first protruding column 111. In an example, an end of the first protruding column 111 facing away from the lens 11 has a larger diameter, thereby preventing a middle portion of the first memory alloy line 26 from falling off from the first protruding column 111.

As an improvement of this embodiment, a second protruding column 112 protrudes from a side of the lens 11 facing away from the second side wall 123b, and the fifth fixing portion 273 of the second memory alloy line 27 is hung on the second protruding column 112. In an example, an end of the second protruding column 112 facing away from the lens 11 has a larger diameter, thereby preventing a middle portion of the second memory alloy line 27 from falling off from the second protruding column 112.

As an improvement of this embodiment, the circuit board 20 further includes a first extending portion 203 attached to the first side wall 123a and a second extending portion 204 attached to the second side wall 123b. The first fixing end 261 and the third fixing end 265 are indirectly fixed to the first side wall 123a through the first extending portion 203, and the fourth fixing end 271 and the sixth fixing end 275 are indirectly fixed to the second side wall 123b through the second extending portion 204. In an example, the first fixing end 261 and the third fixing end 265 are fixed to the first extending portion 203 of the circuit board 20 through the first electric-connecting terminal 28, and the fourth fixing end 271 and the sixth fixing end 275 are fixed to the second extending portion 204 of the circuit board 20 through the second electric-connecting terminal 29.

As an improvement of this embodiment, the lens assembly 100 further includes a recovery structure 30 mounted between the lens 11 and the first base 12 to cooperate with the first memory alloy line 26 and the second memory alloy line 27 to restore the deviated lens 11 to an initial position.

The first side wall 123a and the second side wall 123b are each provided with a first recess 127. Two opposite sides of the lens 11 are each provided with a first protruding portion 113, and the two first protruding portions 113 protrude oppositely and are embedded into the two first recesses 127, respectively. Each first recess 127 includes a first side surface 128 and a second side surface 129 that are spaced apart from each other and arranged in the direction of the optical axis S. Each first protruding portion 113 includes a first surface 114 opposite to the first side surface 128 and a second surface 115 opposite to the second side surface 129. A recovery structure 30 is provided between each first surface 114 and the corresponding first side surface 128, and includes a sixth magnet 305 provided at the first surface 114 and a seventh magnet 306 provided at the first side surface 128 for magnetic attraction with the sixth magnet 305. When the lens 11 is located at the initial position, the sixth magnet 305 directly faces the seventh magnet 306. When the lens 11 is deviated towards the first side wall 123a or the second side wall 123b, for example, when the lens 11 is deviated towards the first side wall 123a, the sixth magnet 305 is misaligned with the seventh magnet 306. The lens 11 is pulled back to its original position by the second memory alloy line 27 after being energized under a magnetic force between the sixth magnet 305 and the seventh magnet 306. By providing the recovery structure 30, a strain force to which the first memory alloy line 26 and the second memory alloy line 27 may be subjected can be reduced.

As an improvement of this embodiment, two sides of each recovery structure 30 are each provided with a guiding structure 31, and the guiding structure 31 includes a fifth guiding groove 311 formed in the lens 11 along a direction of movement of the lens 11, a sixth guiding groove 312 formed in the first base 12 along the direction of movement of the lens 11, and a third ball 313 embedded between the fifth guiding groove 311 and the sixth guiding groove 312. By providing the guiding structure 31, a frictional force generated when the lens 11 and the first base 12 are moving relative to each other can be effectively reduced, so that the lens 11 can be restored more quickly, and a response to image stabilization for the lens 11 can be more sensitive. The fifth guiding groove 311 includes the first surface 114 formed in the lens 11, and the sixth guiding groove 312 includes the first side surface 128 formed in the first base 12.

As an improvement of this embodiment, the lens assembly 100 further includes an image stabilization detecting mechanism 32 for detecting a deviation of the lens 11 in the direction perpendicular to the optical axis S. The image stabilization detecting mechanism 32 is configured to detect whether the lens 11 is deviated towards the first side wall 123a or the second side wall 123b, so as to control whether a current is supplied to the first memory alloy line 26 or the second memory alloy line 27. The image stabilization detecting mechanism 32 is also configured to detect an amount of deviation of the lens 11 towards the first side wall 123a or the second side wall 123b, so as to control a current applied the first memory alloy line 26 or the second memory alloy line 27. In this way, the lens 11 can be pulled back to the initial position more accurately.

In an example, the image stabilization detecting mechanism 32 includes an eighth magnet 321 provided on the lens 11, and a second Hall sensor 322 provided on the circuit board 20 and directly facing the eighth magnet 321.

A side of the lens 11 facing towards the first side wall 123a is provided with a second protruding portion 116 spaced apart from the first protruding portion 113. The eighth magnet 321 is mounted to the second protruding portion 116. A surface of the first side wall 123a facing towards the second protruding portion 116 is provided with an avoiding groove 128 corresponding to the second protruding portion.

As an improvement of this embodiment, each second side surface 129 is provided with a stopper 33 for limiting movement of the lens 11 against the second side surface 129. The stopper 33 can avoid a large displacement of the lens 11 towards the second side surface when an apparatus equipped with the lens assembly 100 drops, resulting in an extremely large spacing between the first surface 114 and the first side surface 128, which may cause the third ball 313 to be disengaged from the fifth guiding groove 311 and the sixth guiding groove 312.

An embodiment of the present invention further provides a method for auto focusing of the lens assembly described above, and the method includes following steps. A current is applied to each of the two memory alloy wires. The first connecting portion and the second connecting portion of each of the two memory alloy wires are shortened after being supplied with the current, so as to pull the lens and the first base to move towards the second base body. The two elastic members are elastically stretched to achieve focusing of the lens. Then, the current is switched off after the focusing is completed, the two elastic members pull the first base back to the initial position, and the lens is restored to the initial position along with the first base.

An embodiment of the present invention further provides an optical image stabilization method for the lens assembly described above, and the optical image stabilization method includes following steps. When the lens is deviated towards the second side plate, the first memory alloy line is elongated. At this time, the first memory alloy line is energized, and the first extending section and the second extending section are shortened after being energized, so as to pull the lens to move towards the first side plate to be restored to the initial position, thereby achieving image stabilization. When the lens is deviated towards the first side plate, the second memory alloy line is elongated. At this time, the second memory alloy line is energized, and the third extending section and the fourth extending section are shortened after being energized, so as to pull the lens to move towards the second side plate to be restored to the initial position, thereby achieving image stabilization.

The above description merely illustrates some embodiments of the present invention. It should be noted that those skilled in the art can make improvements without departing from a creative concept of the present invention, but all these improvements shall fall into a scope of the present invention.

What is claimed is:

1. An auto focusing lens assembly, comprising:
a lens;
a first base;
a second base; and
a pair of restoring structures,
wherein the lens is located in the first base, the second base comprises a bottom plate, a first base body extending from the bottom plate while being bent and provided with a light-through hole, and a second base body spaced apart from the first base body in a direction of an optical axis of the lens; the first base is mounted to the second base body and slidable in the direction of the optical axis; the first base comprises a first side plate provided at each of two sides of the lens; the second base body comprises a second side plate connected to the bottom plate and located at an outer side of the first side plate; and the first side plate comprises: a first plate body opposite to the second side plate, and a second plate body connected to the first plate body and extending to a top of the second side plate while being bent, and
wherein the pair of restoring structures are provided at the two sides of the lens, respectively, and each restoring structure of the pair of restoring structures comprises: an elastic member comprising one end connected to the first side plate and the other end connected to the first base body; a magnet assembly provided between the second side plate and the second plate body, and a guiding structure provided between the second side plate and the second plate body.

2. The auto focusing lens assembly as described in claim 1, wherein a projection of the elastic member in a direction perpendicular to the optical axis does not overlap a projection of the magnet assembly in the direction perpendicular to the optical axis.

3. The auto focusing lens assembly as described in claim 1, wherein a first hook is provided at a side of the first side plate facing towards the first base body, and a second hook is provided at a side of the first base body facing towards the first side plate; and the one end of the elastic member is hooked to the first hook, and the other end of the elastic member is hooked to the second hook.

4. The auto focusing lens assembly as described in claim 3, wherein the second plate body cooperates with the first base body to form a receiving groove for receiving the elastic member, the first hook is provided at a wall surface of the receiving groove facing towards the first base body, and the second hook is provided at a wall surface of the receiving groove facing towards the second plate body.

5. The auto focusing lens assembly as described in claim 1, wherein the magnet assembly comprises a first magnet provided at a side of the second side plate facing towards the second plate body, and a second magnet provided at a side of the second plate body facing towards the second side plate.

6. The auto focusing lens assembly as described in claim 5, wherein a first recess is provided at the side of the second side plate facing towards the second plate body, and the first magnet is embedded into the first recess; and a second recess is provided at the side of the second plate body facing towards the second side plate, and the second magnet is embedded into the second recess.

7. The auto focusing lens assembly as described in claim 1, wherein two sides of the magnet assembly are each provided with the guiding structure.

8. The auto focusing lens assembly as described in claim 7, wherein the guiding structure comprises a first guiding groove formed in the second side plate along the optical axis, a second guiding groove formed in the second plate body along the optical axis, and a ball embedded between the first guiding groove and the second guiding groove.

9. The auto focusing lens assembly as described in claim 7, wherein the guiding structure is provided between the elastic member and the magnet assembly.

\* \* \* \* \*